(12) United States Patent
Oda et al.

(10) Patent No.: US 10,726,213 B2
(45) Date of Patent: Jul. 28, 2020

(54) METAL PRODUCT MANUFACTURING METHOD

(71) Applicant: Mitsui High-tec, Inc., Kitakyushu-shi, Fukuoka (JP)

(72) Inventors: Jin Oda, Kitakyushu (JP); Junya Satake, Kitakyushu (JP)

(*) Notice: Subject to any disclaimer, the term of this patent is extended or adjusted under 35 U.S.C. 154(b) by 166 days.

(21) Appl. No.: 15/983,097

(22) Filed: May 18, 2018

(65) Prior Publication Data
US 2018/0336374 A1 Nov. 22, 2018

(30) Foreign Application Priority Data
May 18, 2017 (JP) .................. 2017-099075

(51) Int. Cl.
| | |
|---|---|
| *G06K 1/12* | (2006.01) |
| *B23K 26/352* | (2014.01) |
| *G06K 5/02* | (2006.01) |
| *B23K 26/00* | (2014.01) |
| *G06K 19/06* | (2006.01) |
| *G06K 7/14* | (2006.01) |
| *B23K 26/03* | (2006.01) |
| *G06K 7/10* | (2006.01) |
| *B23K 101/00* | (2006.01) |

(52) U.S. Cl.
CPC ............ *G06K 1/126* (2013.01); *B23K 26/032* (2013.01); *B23K 26/352* (2015.10); *B23K 26/355* (2018.08); *G06K 5/02* (2013.01); *G06K 7/10722* (2013.01); *G06K 7/1413* (2013.01); *G06K 7/1417* (2013.01); *G06K 19/06037* (2013.01); *B23K 2101/007* (2018.08)

(58) Field of Classification Search
CPC .......... G06K 19/06; G06K 5/02; G06K 1/126; B23K 26/00; B23K 26/352
USPC ....................................... 235/462.1
See application file for complete search history.

(56) References Cited

U.S. PATENT DOCUMENTS

| | | | |
|---|---|---|---|
| 6,681,055 B1 | 1/2004 | Sato | |
| 2007/0144007 A1* | 6/2007 | Smyth | B23P 15/00 29/894.3 |

FOREIGN PATENT DOCUMENTS

| | | |
|---|---|---|
| JP | 2000-222516 | 8/2000 |
| WO | 2014/080157 | 5/2014 |

OTHER PUBLICATIONS

Extended Search Report in corresponding European Application No. 18173110.0, dated Oct. 29, 2018.

* cited by examiner

*Primary Examiner* — Toan C Ly
(74) *Attorney, Agent, or Firm* — Soei Patent & Law Firm

(57) ABSTRACT

A method of manufacturing a metal product includes forming a first identification code onto a surface of a metal member with a laser beam, the first identification code being readable under a first reading condition, and heating the metal member on which the identification code is formed. The method further includes reading the first identification code with a reading device, and forming a second identification code onto the surface of the metal member subsequent to the heating with a laser beam based on the first identification code which is read with the reading device. The second identification code is readable under a second reading condition different from the first reading condition.

17 Claims, 7 Drawing Sheets

METAL PRODUCT MANUFACTURING METHOD

CROSS-REFERENCE TO RELATED APPLICATIONS

This application is based upon and claims the benefit of priority from Japanese Patent Application No. 2017-099075, filed May 18, 2017, the entire contents of which are incorporated herein by reference.

BACKGROUND

1. Field

This disclosure relates to a metal product manufacturing method.

2. Disclosure of the Related Art

Japanese Unexamined Patent Publication No. 2000-222516 discloses a method of making a metal product by forming a two-dimensional code on the surface of a metal member. This method includes forming black markings in a predetermined pattern by repeating a process of irradiating the surface of the metal member with a laser beam to oxidize the metal, thereby engraving circular dots corresponding to the shape of the beam onto the surface. In this manner, a two-dimensional code is formed on the surface of the metal member. The two-dimensional code is a combination of black cells and white cells. The black cells are an aggregation of a plurality of circular dots. The white cells are areas not irradiated with the laser beam. The two-dimensional code functions as an identification code for identifying the individual metal product (e.g., identifying the type, the time and date of manufacture, the material used, or the production line).

SUMMARY

A metal product manufacturing method according to one aspect of the present disclosure includes: forming a first identification code onto a surface of a metal member with a laser beam, the first identification code being readable under a first reading condition; heating the metal member on which the identification code is formed; reading the first identification code with a reading device; and forming a second identification code onto the surface of the metal member subsequent to the heating, with a laser beam, based on the first identification code which is read with the reading device, the second identification code being readable under a second reading condition different from the first reading condition.

The detailed description given herein below and the accompanying drawings are given by way of illustration only.

DETAILED DESCRIPTION

Exemplary embodiments described in the following according to the present disclosure are examples for explaining the present invention, and thus the invention should not be limited to the following details. In the following description, the same elements having the same function are denoted with the same reference signs and an overlapping description may be omitted.

Structure of Stacked Rotor Core

Figure 1:
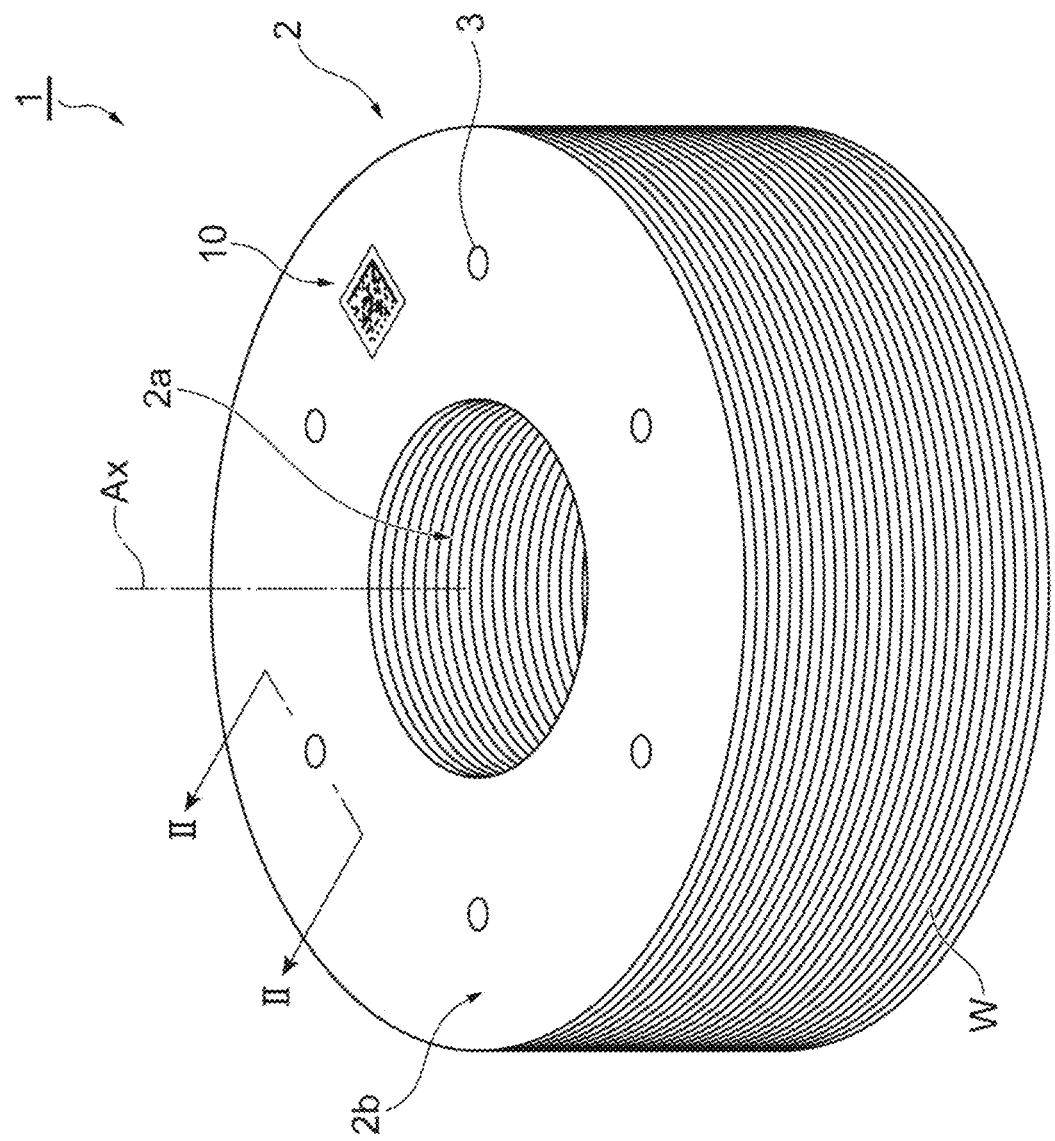
FIG. 1 is a perspective view illustrating an example of a stacked rotor core.
Figure 2:
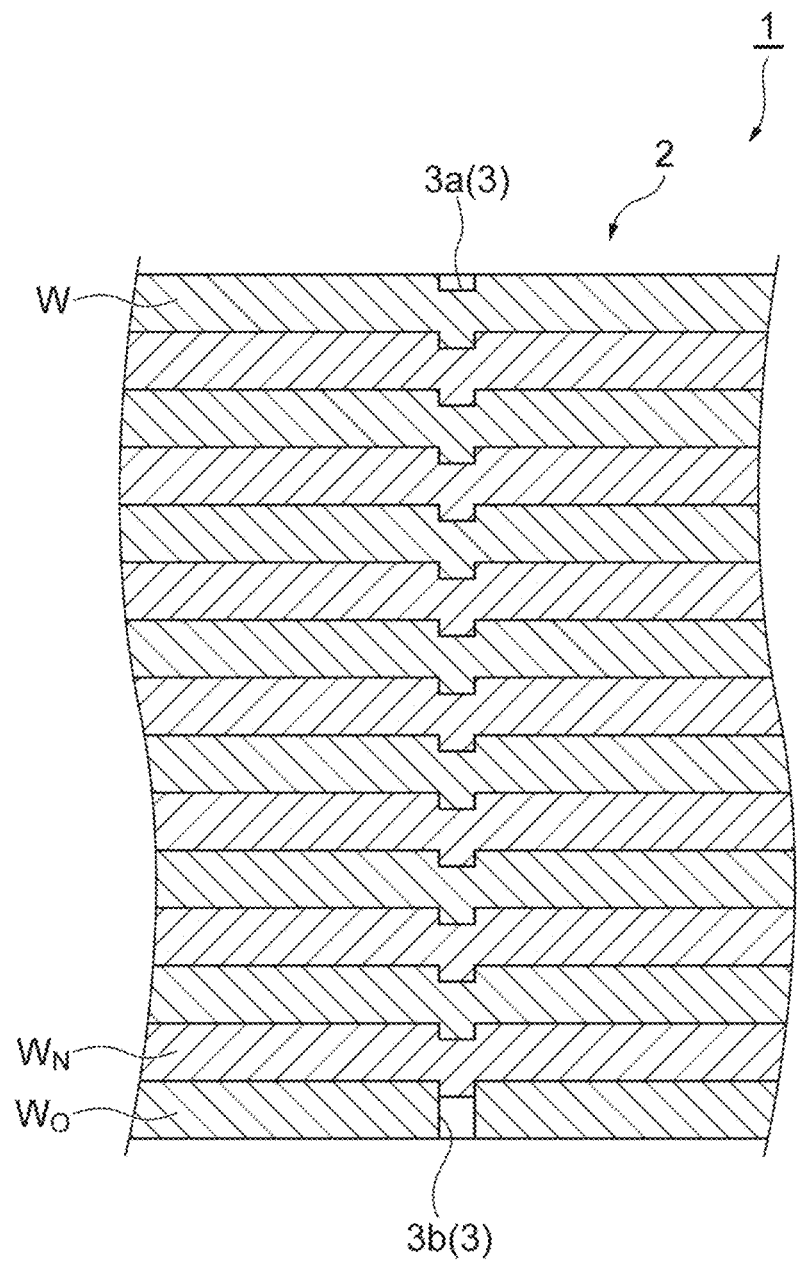
FIG. 2 is a sectional view along the line II-II in FIG. 1.

Referring to FIGS. 1 and 2, a structure of a stacked rotor core 1, which is an example of the metal product, will now be described. The stacked rotor core 1 is a part of a rotor. A rotor is formed by attaching end plates and a shaft (both not shown) to the stacked rotor core 1. The stacked rotor core 1 includes, as illustrated in FIG. 1, a stack 2 (metal member), interlocking parts 3, and an identification code 10.

The stack 2 has a cylindrical shape. In other words, a through hole 2a (central hole) extending along a central axis Ax is provided to the center of the stack 2, as illustrated in FIG. 1. A shaft can be arranged inside of the through hole 2a.

The stack 2 may comprise a plurality of blanked members W which are stacked together. The blanked member W is a plate-like body formed by blanking an electrical steel sheet (metal plate) into a predetermined shape. The stack 2 may be formed by a rotational stack, in which a plurality of blanked members W are stacked while displacing the angles therebetween relative to one another. The angle for the rotational stack may be set to any angle.

In one or more embodiments, the blanked members W which are adjacent to each other in the stacked direction are fastened with the interlocking parts 3. Specifically, the interlocking parts 3 include, as illustrated in FIG. 2, swaged areas 3a formed on the blanked members W other than the blanked member W at the lowest layer of the stack 2. Additionally, the interlocking parts 3 include a through hole 3b formed on the blanked member $W_0$ at the lowest layer of the stack 2. The swaged area 3a includes a depression formed on the front surface of the blanked member W, and a protrusion formed on the rear surface of the blanked member W. The depression of the swaged area 3a provided to one blanked member W is coupled with the protrusion of the swaged area 3a provided to another blanked member W that is adjacently positioned to the front surface of the one blanked member W. The protrusion of the swaged area 3a on the one blanked member W is coupled with the depression of the swaged area 3a on still another blanked member W that is adjacently positioned to the rear surface of the one blanked member W. The protrusion of the swaged area 3a provided to the blanked member $W_N$ adjacently positioned to the blanked member $W_0$ at the lowest layer of the stack 2 is coupled to the through hole 3b. The through hole 3b has a function of, while manufacturing a plurality of stacks 2 consecutively, preventing a blanked member W associated with a subsequently manufactured stack 2 from being inadvertently coupled to a swaged area 3a associated with a blanked member W of the stack 2 having been already manufactured.

Instead of the interlocking part 3, the blanked members W may be fastened using various known methods. For example, the blanked members W may be coupled with one another using an adhesive agent or a resin material, for example, or coupled by welding. Alternatively, temporarily-interlocking parts may be provided to the blanked members W, and a stack may be formed by fastening the blanked members W with the temporarily interlocking parts. The stack 2 may then be obtained by removing the temporarily-interlocking parts from the stack. The "temporarily-interlocking part" herein means a swaged area that is used for temporarily integrating the blanked members W, and removed during the process of manufacturing the product (the stack 2).

The stack 2 may be provided with at least one magnet insertion hole (not shown) that extends along the central axis Ax (stack direction), and passes through the stack 2. The magnet insertion hole having a permanent magnet (not illustrated) disposed therein may be filled with a resin material. The resin material has a function for fixing the permanent magnet inside of the magnet insertion hole, and a function for joining the blanked members W adjacent to each other in a vertical direction.

Details of Identification Code

Figure 3:
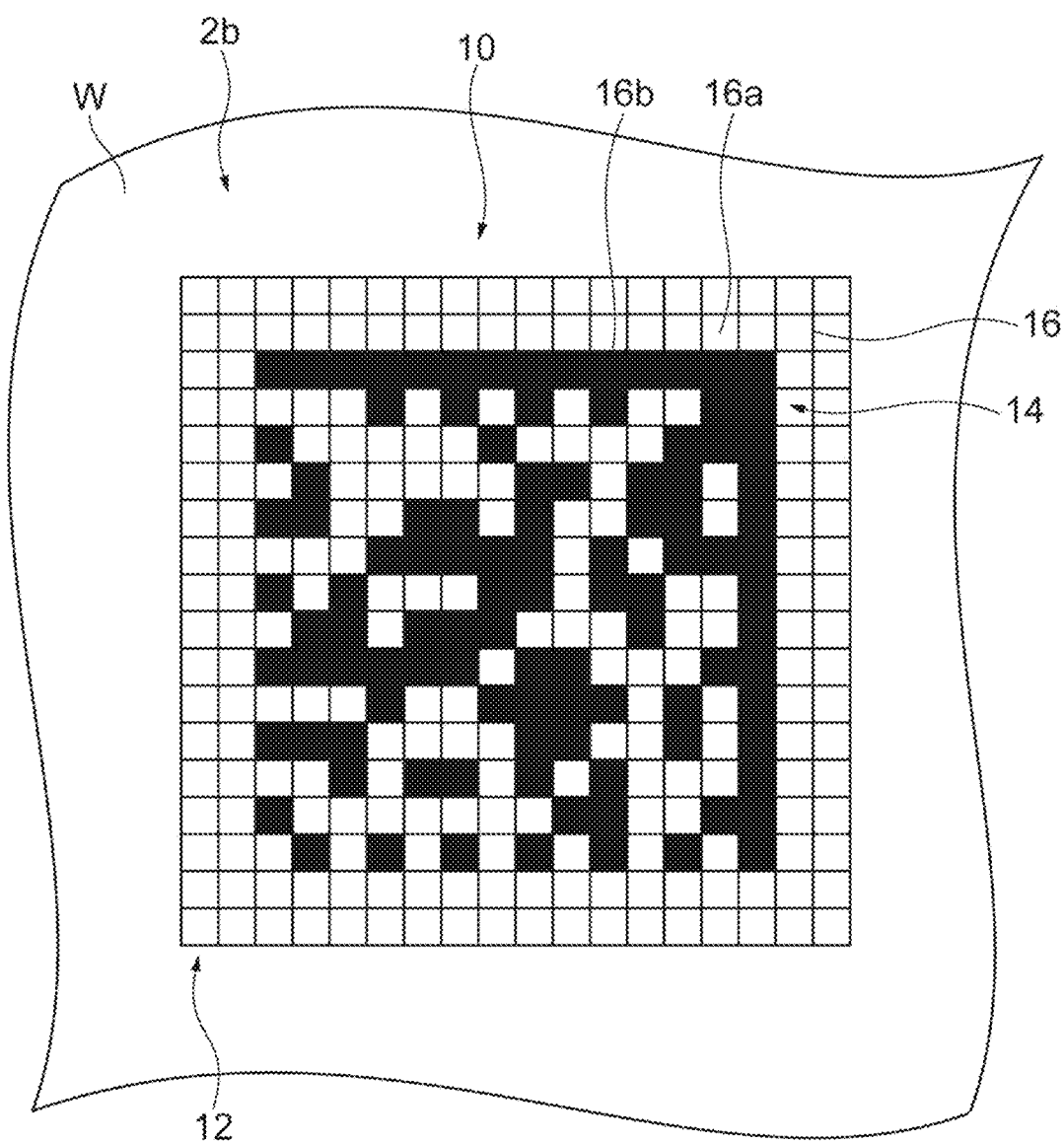
FIG. 3 is a top view illustrating an example of an identification code provided to a stack.

As illustrated in FIG. 1, one identification code 10 is provided to a surface 2b (the front surface or the bottom surface) of the laminate 2, that is, an external surface of the blanked member W at the highest or the blanked member W₀ at the lowest layer of the stack 2. The identification code 10 has a function for containing individual information for identifying the individual stacked rotor core 1 including the identification code 10 (e.g., the type, the time and date of manufacture, the material used, or the production line). The identification code 10 is not limited to any particular code, and may be any code such as a barcode or a two-dimensional code, as long as the code is capable of containing the individual information by combining a light pattern and a dark pattern. Examples of the two-dimensional code include a QR code (registered trademark), DataMatrix, and Vericode. The identification code 10 includes a background area 12 and a black marking 14, as illustrated in FIG. 3 in detail. The identification code 10 has a predetermined pattern that is a combination of the background area 12 and the black marking 14.

The identification code 10 has a plurality of virtual cells 16, as illustrated in FIG. 3. The cells 16 are arrayed in a grid-like shape, and the cells 16, as a whole, correspond to the size of the identification code 10. Although the grid-like lines partitioning the cells 16 are illustrated in FIG. 3, these lines are illustrated merely for convenience for promoting the understanding of the present invention, and an actual identification code 10 does not have these lines. The size of the cell 16 is not limited to a particular size, and may be provided in various sizes depending on the performance requirements or function of the identification code 10. The shape of the cell 16 is not limited to a particular shape, and may be any shape such as a square, a rectangle, a circle, a polygon, and any irregular shape. In one or more embodiments, the cell 16 may be set to a square shape having a size of 0.15 millimeters by 0.15 millimeters, or a size of 0.285 millimeters by 0.285 millimeters, for example. In the description herein, for convenience of explanation, the cells 16 forming the background area 12 will be referred to as a white cell 16a, and the cells 16 forming the black marking 14 will be referred to as a black cell 16b, but it is to be understood that the color designations are arbitrary and may be inverted for example and/or otherwise altered as discussed further herein.

The background area 12 is formed by irradiating the surface 2b of the stack 2 with a background laser beam. The size of the background area 12 is not limited to a particular size, and may be provided in various sizes depending on the size of the stack 2, the type of material of the blanked member W, the position where the identification code 10 is formed, or any combination thereof. The shape of the background area 12 is not limited to a particular shape, and may be any shape such as a square, a rectangle, a circle, a polygon, and any irregular shape. In one or more embodiments, the background area 12 is set as a square having a size of 5 millimeters by 5 millimeters, for example.

Examples of the background laser beam for forming the background area 12 include a YAG laser, a $YVO_4$ laser, and a fiber laser. The background laser beam may be a continuous wave (CW) laser or a pulse oscillation laser. The beam diameter (the diameter of the ray before the beam reaches the target to be irradiated therewith), the spot diameter (the diameter of the ray on the target surface being irradiated with the background laser beam), and the output of the background laser beam are not particularly limited to particular sizes and a particular output, and various sizes and outputs may be used depending on the type of beam, the type of material of the blanked member W, the thickness of the blanked member W, or any combination thereof. Because the target being irradiated with the background laser beam melts by a different degree depending on the type of the target material, the spot diameter may change even if the beam diameter is the same.

In one or more embodiments, the black marking 14 is formed by irradiating the background area 12 with a marking laser beam. The black marking 14 is formed by oxidizing the blanked member W with the marking laser beam, and causing the blanked member W to turn into the black color. The black marking 14 has a predetermined pattern, and the black marking 14, together with the background area 12 surrounding the black marking 14, form the identification code 10. Specifically, the black marking 14 is an aggregation of a plurality of black cells 16b that is filled with the black color by irradiating the cells with the marking laser beam, as illustrated in FIG. 3.

Examples of the marking laser beam for forming the black marking 14 include a YAG laser, a $YVO_4$ laser, and a fiber laser. The marking laser beam may be a CW laser or a pulsed oscillation laser. The beam diameter (the diameter of the ray before the beam reaches the target to be irradiated therewith), the spot diameter (the diameter of the ray on the target surface being irradiated with the background laser beam), and the output of the marking laser beam are not particularly limited to particular sizes and a particular output, and various sizes and outputs may be used depending on the type of beam, the type of material of the blanked member W, the thickness of the blanked member W, or any combination thereof. The output of the marking laser beam may be higher than that of the background laser beam e.g., 10 times the output of the background laser beam or even higher. Because the target being irradiated with the marking laser beam melts by a different degree depending on the type of the target material, the spot diameter may change even if the beam diameter remains the same.

Structure of Identification Code Forming Apparatus

A forming apparatus 100 of forming the identification code 10 on the stack 2 will now be explained with reference to FIG. 4. The forming apparatus 100 includes a transport conveyor 101, laser devices 102, 103, a heating furnace 104, cameras 105, 106 (reading devices), and a controller 107 (control unit). The controller 107 may comprise hardware or firmware such as a computer, a computing device, a processor, a central processing device, or any type of processing device.

The transport conveyor 101 is caused to operate in response to an instruction from the controller 107, and has a function of transporting the stack 2 or the stacked rotor core 1 that is placed thereon in a predetermined direction.

The first laser device 102 is disposed above the transport conveyor 101 and upstream of the heating furnace 104. The second laser device 103 is disposed above the transport conveyor 101 and downstream of the heating furnace 104. The laser devices 102, 103 can output the background laser beam or the marking laser beam in response to an instruction from the controller 107 while the stack 2 is being transported by the transport conveyor 101 passes below the laser devices 102, 103, and has a function of forming the identification code 10 on the surface 2b of the stack 2.

The heating furnace 104 is caused to operate in response to an instruction from the controller 107, and has a function of heating the stack 2 that is placed inside of the heating furnace 104. Examples of the heating performed by the heating furnace 104 include burn-off, annealing, and bluing. Burn-off is a process of removing (e.g., vaporizing) the grease attached on the blanked members W forming the stack 2, and the stack 2 is heated to approximately 400° C., for example. Annealing is a process of removing an internal distortion of the blanked members W forming the stack 2, and the stack 2 is heated to approximately 700° C. to 800° C., for example. Bluing is a process of forming an oxide film on the surfaces of the blanked members W, by intentionally oxidizing the surfaces of the blanked members W, to rust-proof the blanked members W forming the stack 2, and the stack 2 is heated to approximately 350° C., for example.

The first camera 105 is disposed above the transport conveyor 101, and is positioned between the heating furnace 104 and the second laser device 103. The second camera 106 is disposed above the transport conveyor 101 and downstream of the second laser device 103. The cameras 105, 106 are caused to operate in response to an instruction from the controller 107, and have a function of capturing an image of the identification code 10 while the stack 2 transported by the transport conveyor 101 passes below the cameras 105, 106.

The controller 107 generates an instruction signal for causing each of the transport conveyor 101, the laser devices 102, 103, the heating furnace 104, and the cameras 105, 106 to operate, and transmits the instruction signal to the corresponding device, based on a computer program recorded in a recording medium (not shown), or based on an operation input performed by an operator, for example. The controller 107 receives captured image data captured by the cameras 105, 106, and identifies the identification code 10 by processing the received captured image data.

Forming Method of Identification Code (Manufacturing Method of Laminated Rotor Core)

A forming method of the identification code 10 on the stack 2, that is, a manufacturing method of the stacked rotor core 1 will now be explained with reference to FIGS. 4 to 7B. First, the stack 2 is formed by causing a punching device (not shown) to blank blanked members W from an electrical steel sheet (workpiece plate) that is a band-like metal sheet, and to stack the blanked members W. The stack 2 discharged from the punching device is placed on the transport conveyor 101.

Figure 4:
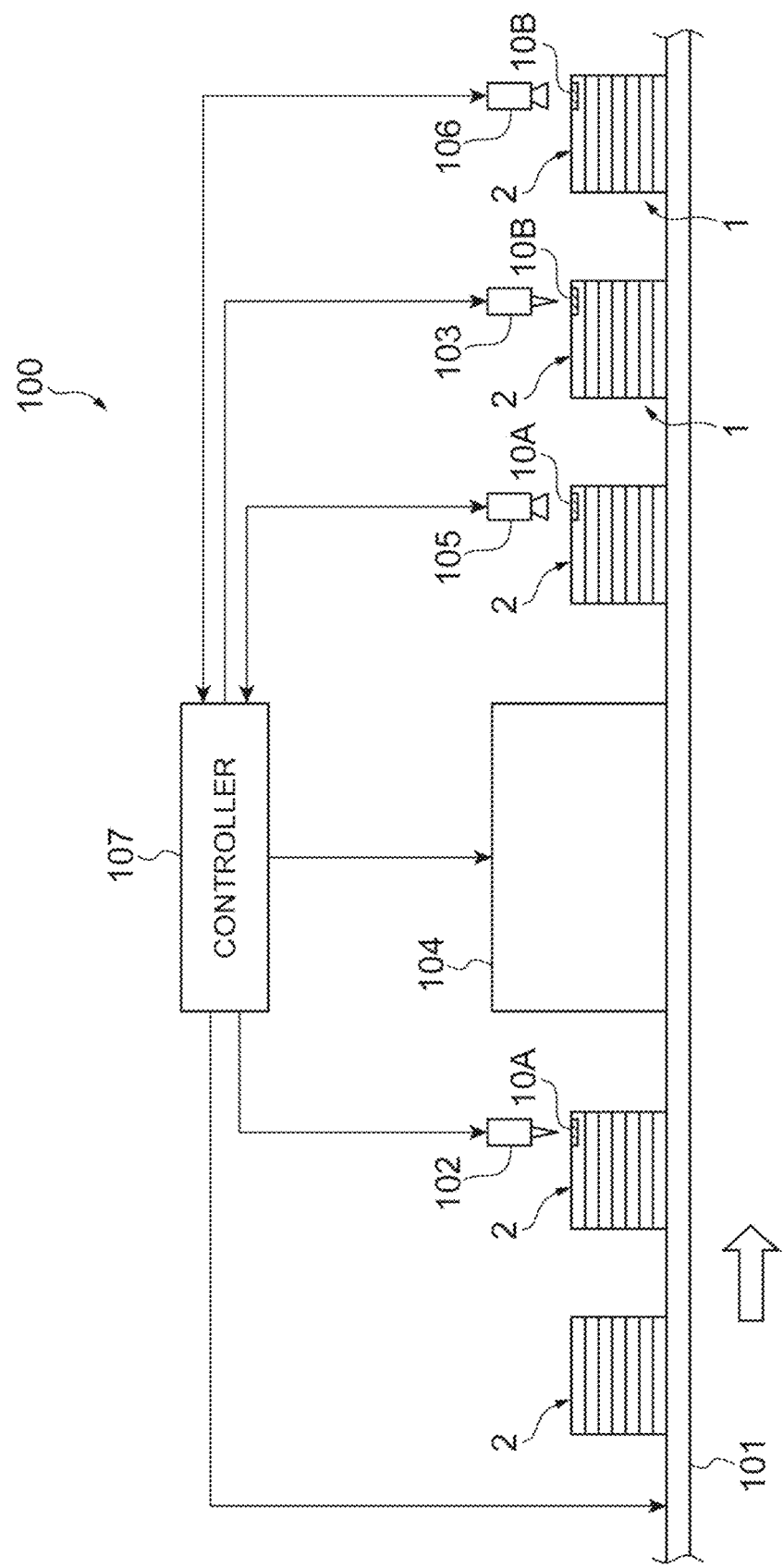
FIG. 4 is a schematic view for generally explaining an example of a process of forming the identification code (a process for manufacturing a metal product)
Figure 5A:
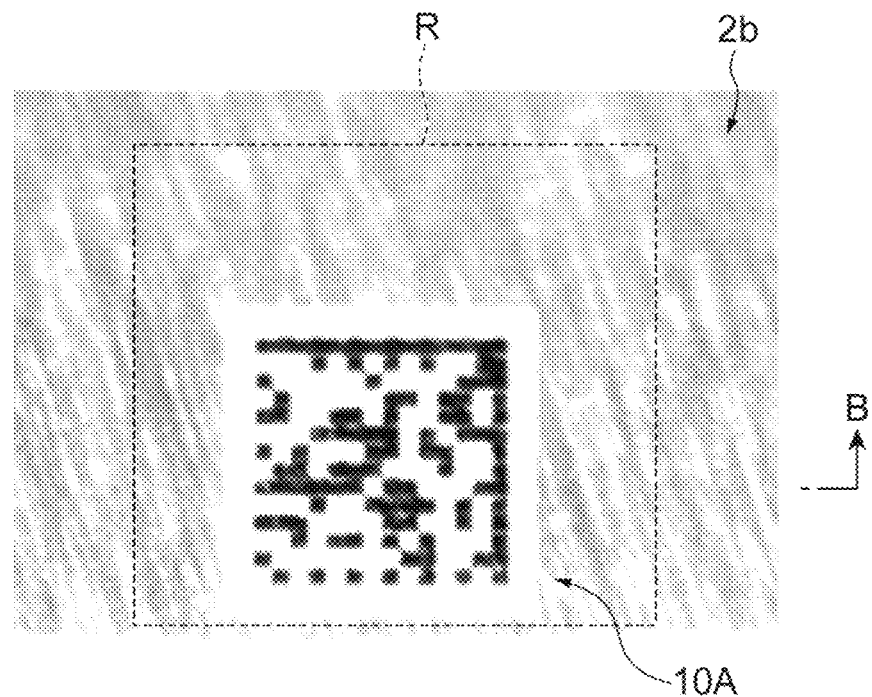
FIG. 5A is a top view illustrating an example of the identification code that is provided to the laminate prior to heating.
Figure 5B:
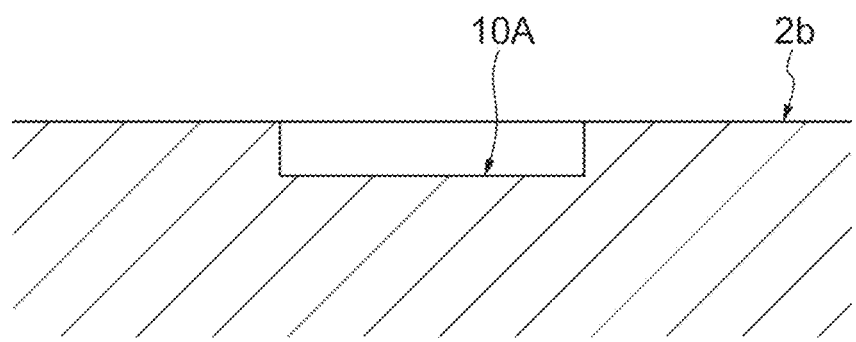
FIG. 5B is a sectional view along the line B-B in FIG. 5A.

The transport conveyor 101 is then driven by the controller 107, as illustrated in FIG. 4, and the stack 2 on the transport conveyor 101 reaches a position below the laser device 102. At this timing, the laser device 102 is controlled by the controller 107, and a predetermined area R on the surface 2b of the stack 2 is irradiated with the background laser beam and the marking laser beam that are output from the laser device 102. In this manner, as illustrated in FIGS. 5A and 5B, the identification code 10 (first identification code) that is smaller than the area R is formed inside of the area R (first process). In the description herein, the identification code 10 before the stack 2 is heated in the heating furnace 104 is referred to as an "identification code 10A". The depth of the identification code 10A (see FIG. 5B) may be approximately 5 µm, for example.

Figure 6A:
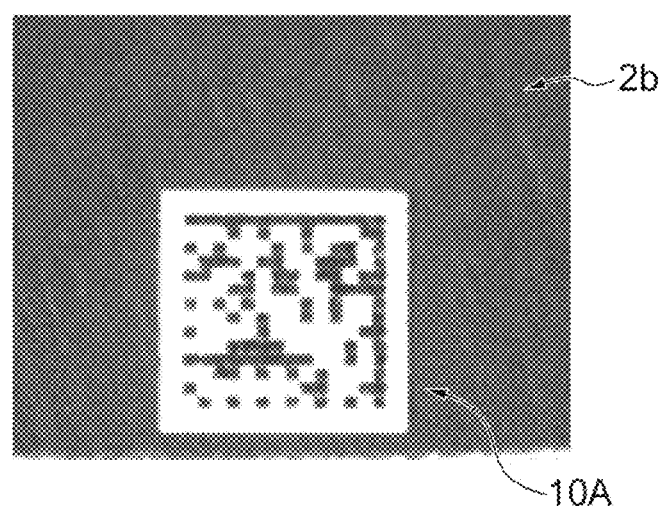
FIG. 6A to FIG. 6C are top views illustrating some examples after the heating, the identification code of the examples being provided to the stack prior to the heating.
Figure 6B:
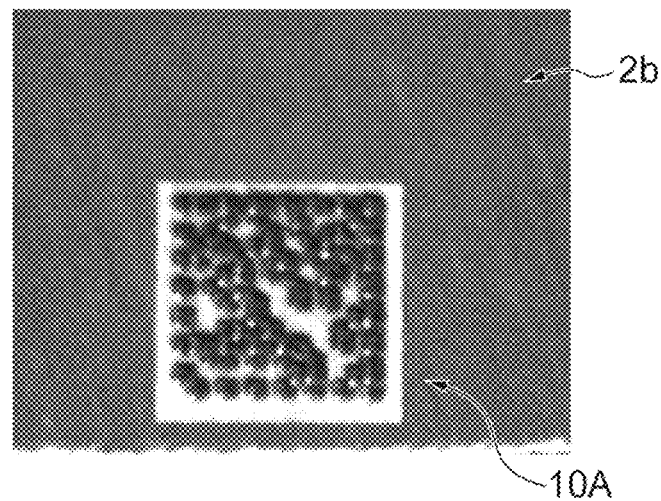
Figure 6C:
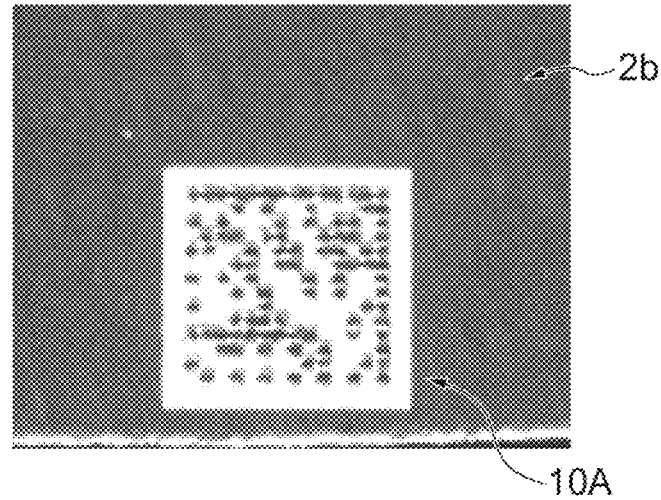

The transport conveyor 101 is then driven by the controller 107, and the stack 2 on the transport conveyor 101 is transported into the heating furnace 104, as illustrated in FIG. 4. The heating furnace 104 is then controlled by the controller 107, and applies predetermined heating to the stack 2 (second process). As the stack 2 is heated, the appearance of the identification code 10A may change, as illustrated in FIGS. 6A to 6C, for example. Specifically, in the identification code 10A illustrated in FIG. 6A, the depth of the black marking 14 in the surface 2b of the stack 2 is reduced across the entire identification code 10A. In the identification code 10A illustrated in FIG. 6B, the size of the black marking 14 is increased across the entire identification code 10A. In the identification code 10A illustrated in FIG. 6C, the size of the black marking 14 is reduced across the entire identification code 10A. When bluing, which is one type of heating, is applied to the stack 2, the surface 2b of the stack 2 oxidizes and turns into a substantially blue or black color, as illustrated in FIGS. 6A to 6C.

The transport conveyor 101 is then driven by the controller 107, and the stack 2 on the transport conveyor 101 reaches a position below the first camera 105, as illustrated in FIG. 4. At this timing, the camera 105 is controlled by the controller 107, and the camera 105 is caused to read the identification code 10A formed on the surface 2b of the stack 2. The controller 107 processes the captured image data captured by the camera 105, and identifies the identification code 10A based on the data (third process).

In one or more embodiments, the conditions under which the camera 105 reads the identification code 10A (e.g., parameters such as the exposure time, the reading angle, and the amount of incident light) (first reading condition) are relatively loosely set. Therefore, when the controller 107 determines that the reading of the identification code 10A has failed, the controller 107 can cause the camera 105 to capture the image of the identification code 10A repeatedly while changing the parameters within a range of such conditions, as long as the stack 2 remains in proximity or within the range of images captured by the camera 105. For example, the camera 105 may read the first identification code 10A multiple times, repeatedly, under the first reading condition (e.g. one or more repeated readings), while the camera 106 may read the second identification 10B only once (0 repeated reading), or fewer repeated reading than the camera 105, under the second reading condition. When multiple readings are repeated by the first and/or second camera 105, 106, some additional processing may be carried out based on the multiple readings in order to determine the information represented by the first or second identification code.

Figure 7A:
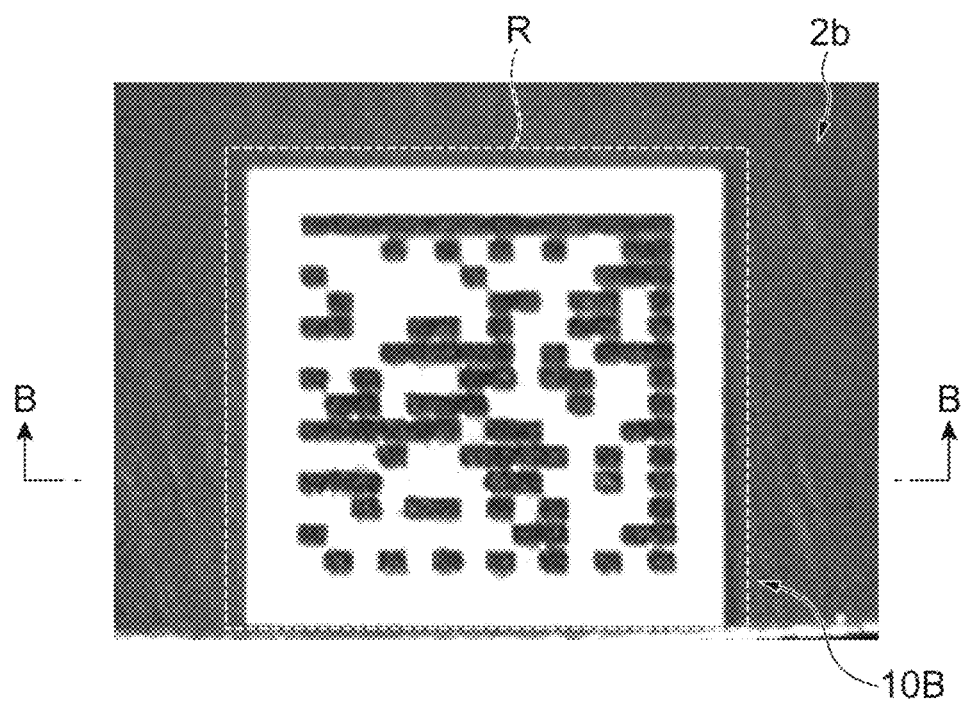
FIG. 7A is a top view illustrating an example of identification code that is provided to the laminate subsequently to the heating.
Figure 7B:
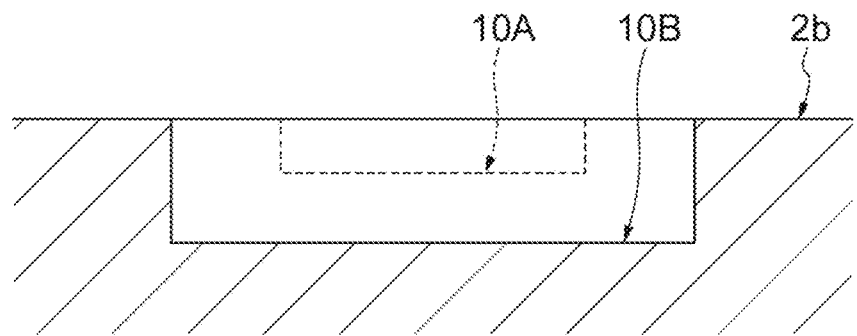
FIG. 7B is a sectional view along the line B-B in FIG. 7A.

The transport conveyor 101 is then driven by the controller 107, and the stack 2 on the transport conveyor 101 reaches a position below the second laser device 103, as illustrated in FIG. 4. At this timing, the laser device 103 is controlled by the controller 107, and substantially the entire area R is irradiated with the background laser beam and the marking laser beam output from the laser device 103. In this manner, as illustrated in FIGS. 7A and 7B, the identification code 10 (second identification code) is approximately the same size as the area R (fourth process). In this manner, the finished stacked rotor core 1 is obtained, having the identification code 10 provided to the stack 2. In the description herein, the identification code 10 after the stack 2 is heated in the heating furnace 104 is referred to as an "identification code 10B". The identification code 10B is for used based on the identification code 10A read by the camera 105. Therefore, the identification code 10B has a pattern equivalent to that of the identification code 10A, although the size thereof is different from that of the identification code 10A. Therefore, the identification code 10B contains the same information as the identification code 10A. The depth of the identification code 10B in the surface 2b of the stack 2 is set deeper than that of the identification code 10A (see FIG. 7B). The depth of the identification code 10B may be approximately 7 μm to 10 μm, for example, or 1.5 to 2 times the depth of the identification code 10A.

The transport conveyor 101 is then driven by the controller 107, and the stack 2 on the transport conveyor 101 reaches a position below the second camera 106, as illustrated in FIG. 4. At this timing, the camera 106 is controlled by the controller 107, and the camera 106 is caused to read the identification code 10B formed on the surface 2b of the stack 2. The controller 107 processes the captured image data captured by the camera 106, and identifies the identification code 10B based on the data.

In one or more embodiments, the conditions under which the camera 106 reads the identification code 10B (e.g., parameters such as the exposure time, the reading angle, and the amount of incident light) (second reading condition) are set relatively strictly. Therefore, if the controller 107 determines that the reading of the identification code 10B has failed even after the camera 106 has kept capturing the images under the reading conditions over a predetermined number of times, the controller 107 may determine that the identification code 10B is defective, and may perform a process of removing the stacked rotor core 1 having the identification code 10B from the transport conveyor 101. Accordingly, the first reading condition and the second reading condition may be associated with different quality levels of reading environment. The different quality levels of reading environment may be based on: an exposure time of the first identification code 10A to the camera 105 in comparison to an exposure time of the second identification code 10B to the camera 106; an intensity of a light source reflected on the surface of the metal member at the first identification code 10A, in comparison to an intensity of a light source reflected at the second identification code 10B; an angle of the camera 105 relative to the first identification code 10A in comparison to an angle of the camera 106 relative to the second identification code 10B; a position of the camera 105 relative to the first identification code 10A in comparison to a position of the camera 106 relative to the second identification code 10B; a distance of the camera 105 relative to the first identification code 10A in comparison to a distance of the camera 106 relative to the second identification code 10B; a sensitivity of the camera 105 relative to a sensitivity of the camera 106; a number of repeated readings of the camera 105 relative to the camera 106; and/or the like. For example, the first reading condition may comprises a longer exposure time, as compared to the second reading condition, e.g. an exposure time of the first identification code 10 A to the camera 105 is longer in comparison to an exposure time of the second identification code 10B to the camera 106. In another example, the first reading condition may comprise a higher intensity light source as compared to the second reading condition. The sensitivity of the camera 105 or of the camera 106 may be associated with the capacity of the camera 105, 106 to accurately read the information in the respective first and second identification codes, for example, a resolution (number of pixels, pixel size, etc.) of the camera 105, 106, a capacity of the camera 105, 106 to detect color variations, a capacity of the camera 105, 106 to adapt to ambient light conditions, etc. In some examples, the first reading condition is associated with a first range of one or more reading parameters and the second reading condition is associated with a second range of the one or more reading parameters, that is narrower than the first range. The reading parameters may include: an exposure time to the camera 105, 106; a intensity of an environing light source; a position, angle and/or distance of the camera 105, 106 relative to the first or second identification code 10A, 10B; a sensitivity of the camera 105, 106; a number of repeated readings by the camera 105,106; and/or the like. In addition, the first identification code 10A and the second identification code 10B may have different quality levels of readability, based on at least one of: the respective overall sizes of the first and second identification codes 10A, 10B; the respective color contrasts in the first and second identification codes 10A, 10B; the respective number of pixels (i.e. spatial resolutions) associated with the first and second identification codes 10A, 10B; the respective sizes (i.e. surface area) of the first and second identification codes 10A, 10B; and/or the like. For example, the first identification code 10A may be associated with a higher number of pixels, as compared to the second identification code 10B, that is to say, the first identification code 10A is marked based on image data containing more pixels, as compared to image data for marking the second identification code 10B. In another example, the first identification code 10A comprises more color contrast, as compared to the second identification code 10B, in the grey scale or in a color scale. In an example where the first and second identification code 10A, 10B each comprises a light background, with dark portions formed thereon representing the code information, a contrast between the dark portions and the light background may be stronger in the first identification code 10A in comparison with the second identification code 10B. In another example, a higher or stronger contrast may be achieved in the first identification code 10A by using color (non grey-scale), while making the second identification code 10B monochrome (grey scale). In some embodiments, the first identification code 10A comprises more information than the second identification code 10B. In another example, the first identification code 10A is associated with a larger size of pixels, as compared to the second identification code 10B, that is to say, the first identification code 10A is composed of larger graphical units. In many of the examples described herein, the first identification code 10A is imparted with higher visual or graphical quality, in that it contains more accurate information and is easier to accurately read, as compared to the second identification code 10B. However, it will be understood that the features of the first and second identification codes 10A, 10B may be reversed in any of the examples described herein. Similarly, the first and second reading conditions may be reversed in the examples described herein.

Effects

A two-dimensional code is formed on a metal member that is an intermediate product of a metal product, at the stage before the manufacture of the metal product is completed, so that the production process of the metal product can be kept track of even after the manufacture. During the manufacturing process of the metal product, the metal member may be heated to a temperature exceeding hundreds of degrees centigrade. When such heating is applied, the surface of the metal member may tarnish due to oxidization, or the appearance of the two-dimensional code itself may change (e.g., the white area or the black area may expand or shrink). Therefore, the readability of the two-dimensional code may deteriorate, or the readability of the two-dimensional code may vary.

However, one or more embodiments, such as described above, may include a system or method for: reading in advance the identification code 10A that is readable under a first reading condition; and forming the identification code 10B on the surface 2b of the stack 2 based on the identification code 10A after the heating of the stack 2. In some embodiments, the identification code 10B is readable under a second reading condition different from the first reading condition. Therefore, even when the appearance of the identification code 10A changes after the heating of the stack 2, the identification code 10B equivalent to the identification code 10A is formed on the surface 2b of the stack 2. Accordingly, the readability of the identification code 10 can be improved even when heating is included in the manufacturing process.

In one or more embodiments, after the heating of the stack 2, the identification code 10B that is readable under the second reading condition different from the first reading condition is newly formed on the surface 2b of the stack 2. For example, the first reading condition for reading the identification code 10A after being affected by the heating operation can be relatively loose or permissive, whereas the identification code 10B which is not affected by the heating operation can be read under the second reading condition that is relatively strict.

There are sometimes cases in which a large number of stacks 2 stored in a cage are heated in the heating furnace 104. Therefore, if the identification code 10A provided to the stack 2 is read before the stack 2 is transported into the heating furnace 104, the order of the stacks 2 may be swapped in the process of placing or removing the stacks 2 into or from the cage, and the identification code 10B may be formed, based on the identification code 10A, on a stack 2 that is different from the stack 2 provided with the corresponding identification code 10A. However, in one or more embodiments, because the camera 105 reads the identification code 10A after the stacks 2 are heated, the stacks 2 are less likely to be swapped or exchanged in between reading the identification code 10A and the formation of the identification code 10B. Therefore, it is possible to ensure that the stack 2 associated with the identification code 10A is identical with the stack 2 after forming of the identification code 10B based on the identification code 10A.

In one or more embodiments, the identification code 10B is formed at the same position as the identification code 10A, and the depth of the identification code 10B is set deeper than the depth of the identification code 10A. In this manner, the identification code 10A is completely removed by the identification code 10B, and therefore, only the identification code 10B remains on the surface of the manufactured stacked rotor core 1. Hence, the position of the reading of the identification code 10 may be limited to one location of the stacked rotor core 1, and therefore, the readability of the identification code 10 can be improved further. Furthermore, because the identification codes 10A and 10B are formed (engraved) on the stack 2 with a laser beam, the stack 2 may become damaged. However, in some embodiments, because the identification code 10B is formed at the same position as the identification code 10A, the damages of the stack 2 can be generally limited to the area R (FIG. 7A).

In one or more embodiments, the size of the identification code 10B may be larger than that of the identification code 10A so that a part of the identification code 10B completely overlaps or coincides with the entire identification code 10A. Therefore, the entire identification code 10A can be removed or overwritten more reliably by the identification code 10B.

Other Embodiments

A number of embodiments are explained above in detail, but various modifications may be made to the embodiments described above, within the scope of the essence of the present disclosure.

(1) For example, the identification codes 10A and 10B may be formed at a different position on the surface 2b of the stack 2. In other words, the identification code 10A and the identification code 10B may both be present on the surface 2b of the stack 2 at the same time. Alternatively, the identification code 10B may be formed at a position different from the position where the identification code 10A is formed, and the identification code 10A may then be deleted (e.g., by destroying the identification code 10A with a laser beam) to make the identification code 10A unavailable for reading.

(2) The identification codes 10A and 10B may be formed on the top surface of the stack 2, or on the bottom surface of the stack 2. One of the identification codes 10A and 10B may be formed on the top surface of the stack 2, and the other one of the identification codes 10A and 10B may be formed on the bottom surface of the stack 2.

(3) The identification code 10A may be read before or after the stack 2 is heated.

(4) There are various other processes between the formation of the identification code 10A and the heating operation of the stack 2, and the identification code 10A may be used in such processes.

(5) Additionally, there are various other processes, other than the reading of the identification code 10B, after the identification code 10B is formed, and the identification code 10B may be used in such processes.

(6) The identification code 10 may be configured as any combination of the background area 12 and the black marking 14. In other words, the black marking 14 may be formed on the background area 12 in some embodiments. Alternatively, the background area 12 and the black marking 14 may be formed so as not to overlap with each other. Some overlapping of the background area 12 and the black marking 14 due to irradiation error with the background laser beam and the marking laser beam may be tolerable in some types of applications or uses.

(7) The black marking 14 may be formed directly on the surface 2b of the stack 2 without forming the background area 12.

(8) When a permanent magnet is provided inside of the stack 2, metallic end plates made of a material such as stainless steel may be arranged on both ends of the stack 2 to suppress demagnetization of the magnet, and the identification code 10 may be provided to or formed on the metal end plate.

(9) The identification code 10 may be provided as other forms besides a combination of the white cells 16a and the black cells 16b. In other words, the identification code 10 may be provided as a combination of various colors other than white color and black color, as long as such colors can achieve enhanced contrast. For example, the identification code 10 may be a layered two-dimensional code (two-dimensional shape code multilayering color information). An example of the layered two-dimensional code includes a PM code (registered trademark).

(10) In some embodiments, the identification code 10B having a pattern equivalent to the pattern of the identification code 10A is formed on the surface 2b of the stack 2, but these patterns may be different as long as the identification codes 10A and 10B contain the same information. For example, when the identification code 10A and the identification code 10B are created using different algorithms, the identification code 10A and the identification code 10B may have different patterns but contain the same information.

(11) Without limitation to the stacked rotor core 1, the present disclosure may also be applied to a stacked stator core, or to various other metal products.

EXAMPLES

Example 1

A metal product manufacturing method according to one example of the present disclosure includes: forming a first identification code onto a surface of a metal member with a laser beam, the first identification code being readable under a first reading condition; heating the metal member on which the identification code is formed; reading the first identification code with a reading device; and forming a second identification code onto the surface of the metal member subsequent to the heating with a laser beam based on the first identification code which is read with the reading device, the second identification code being readable under a second reading condition different from the first reading condition. In this case, even when the appearance of the first identification code changes after the heating of the metal member, the second identification code equivalent to the first identification code is formed on the surface of the metal member based on the first identification code which is read in advance with the reading device. Therefore, even when heating is included in the manufacturing process, the readability of the identification code can be improved.

When the second reading condition is stricter than the first reading condition, for example, parameters such as the exposure time, the reading angle, and the amount of incident light can be set relatively freely (e.g., within a relatively broad range) as the first reading condition, while such parameters are set within a predetermined range in the second reading condition (e.g., within a relatively narrow range). Specifically, there are cases in which the first reading condition can be set loosely or permissively because reading of such an identification code is only required in the factory during a process of manufacturing the metal product. In some examples, however, the second reading condition is set more strictly to ensure the readability of the identification code under a specified reading condition after the metal product is shipped. In such a case, according to Example 1, the second identification code is newly formed on the surface of the metal member after the heating of the metal member, the second identification code being readable under the second reading condition different from the first reading condition. Therefore, the first identification code that is heated can be read under the first reading condition that is a relatively loose standard, and the second identification code that is not heated can be read under the second reading condition that is a relatively strict standard, for example.

Example 2

In the method according to Example 1, the operation of reading the first identification code may be performed subsequent to the formation of the first identification code and subsequent to heating the metal member. In this case, the first identification code may be read immediately before or at approximately the same time as forming the second identification code. Therefore, there is almost no chance of the metal member being swapped with another metal member during the time period between reading the first identification code and forming the second identification code. Hence, it is possible to ensure that the metal member associated with the first identification code is identical with the metal member associated with the second identification, based on reading the first identification code.

Example 3

In the method according to Example 1 or 2, the formation of the second identification code may include forming the second identification code at the same position as the first identification code so that the second identification code has a depth which is greater than that of the first identification code. In this case, the first identification code may be completely removed by the second identification code, and only the second identification code is present on the surface of the manufactured metal product. In embodiments in which the position for reading the identification code is limited to one location, the readability of the identification code can therefore be improved further. Furthermore, because the first and second identification codes may be formed (engraved) on the metal member with a laser beam, the metal member may be damaged. However, according to Example 3, because the second identification code is formed at the same position as the first identification code, the damage of the metal member can be limited to a finite or relatively small area.

Example 4

In the method according to Example 3, the formation of the second identification code may include forming the second identification code to have a size larger than that of the first identification code so that a part of the second identification code completely overlaps or coincides with the entire first identification code. In this case, the first identification code can be entirely removed more reliably by the second identification code.

It is to be understood that not all aspects, advantages and features described herein may necessarily be achieved by, or included in, any one particular example embodiment. Indeed, having described and illustrated various examples herein, it should be apparent that other examples may be modified in arrangement and detail. We claim all modifications and variations coming within the spirit and scope of the subject matter claimed herein.

What is claimed is:

1. A metal product manufacturing method comprising:
    forming a first identification code onto a surface of a metal member with a first laser beam, the first identification code being readable under a first reading condition;
    heating the metal member on which the identification code is formed;
    reading the first identification code with a reading device; and
    forming, with a second laser beam, a second identification code onto the surface of the metal member subsequent to heating the metal member, wherein the second identification code is based on the first identification code which is read with the reading device, the second identification code being readable under a second reading condition different from the first reading condition,
    wherein forming the second identification code includes forming the second identification code at a same position on the metal member as the first identification code so that a depth of the second identification code is greater than a depth of the first identification code, and
    wherein forming the second identification code includes forming the second identification code on an area of the surface of the metal member which is larger than an entire area of the first identification code so that a part of the second identification code coincides with the entire area of the first identification code.

2. The method according to claim 1, wherein the first identification code is read subsequent to both forming the first identification code and heating the metal member.

3. The method according to claim 1, wherein forming the second identification code comprises overwriting the first identification code so that the first identification code is no longer readable.

4. The method according to claim 3, further comprising:
    generating, with a controller, the second identification code in response to the reading device having read the first identification code subject to the first reading condition;
    instructing, with the controller, the second laser beam to form the second identification code onto the surface of the metal member; and
    reading, with a second reading device, the second identification code subject to the second reading condition.

5. The method according to claim 1, wherein the first reading condition comprises a longer exposure time or a higher intensity light source, as compared to the second reading condition.

6. The method according to claim 1, wherein the first identification code has a different pattern than the second identification code, and wherein the first identification code and the second identification code contain identical information.

7. A metal product manufacturing method comprising:
    forming a first identification code onto a surface of a metal member with a first laser beam, the first identification code being readable under a first reading condition;
    heating the metal member on which the identification code is formed;
    reading the first identification code with a reading device; and
    forming, with a second laser beam, a second identification code onto the surface of the metal member subsequent to heating the metal member, wherein the second identification code is based on the first identification code which is read with the reading device, the second identification code being readable under a second reading condition different from the first reading condition,
    wherein the first reading condition and the second reading condition are associated with different quality levels of reading environment, based on at least one of: an exposure time to the reading device, a required intensity of ambient light during reading, a distance of the reading device relative to the second identification code, a sensitivity level of the reading device, and a number of repeated readings by the reading device.

8. The method according to claim 7, wherein compared to the second identification code, the first identification code:
    is associated with a higher number of pixels;
    is associated with a larger size of pixels; or
    comprises more color contrast.

9. The method according to claim 7, wherein the first identification code and the second identification code have different quality levels of readability, based on at least one of: an overall size, a color contrast, a number of pixels, and a pixel size.

10. The method according to claim 7, wherein the first identification code is read subsequent to both forming the first identification code and heating the metal member.

11. The method according to claim 7, wherein the first reading condition comprises a longer exposure time or a higher intensity light source, as compared to the second reading condition.

12. The method according to claim 7, wherein the first identification code has a different pattern than the second identification code, and wherein the first identification code and the second identification code contain identical information.

13. The method according to claim 1, A metal product manufacturing method comprising:
    forming a first identification code onto a surface of a metal member with a first laser beam, the first identification code being readable under a first reading condition;
    heating the metal member on which the identification code is formed;
    reading the first identification code with a reading device; and
    forming, with a second laser beam, a second identification code onto the surface of the metal member subsequent to heating the metal member, wherein the second identification code is based on the first identification code which is read with the reading device, the second identification code being readable under a second reading condition different from the first reading condition,
    wherein the first reading condition is associated with a first range of one or more reading parameters and the second reading condition is associated with a second range of the one or more reading parameters,
    wherein the one or more parameters comprise at least one of: an exposure time, an intensity of a light source, a reading angle relative to the surface of the metal member, a reading position relative to the surface, a reading distance relative to the surface, a reading device sensitivity, and a number of repeated readings, and
    wherein the second range is narrower than the first range.

14. The method according to claim 13, wherein compared to the second identification code, the first identification code:
    is associated with a higher number of pixels;

is associated with a larger size of pixels; or
comprises more color contrast.

15. The method according to claim 13, wherein the first identification code and the second identification code have different quality levels of readability, based on at least one of: an overall size, a color contrast, a number of pixels, and a pixel size.

16. The method according to claim 13, wherein the first identification code is read subsequent to both forming the first identification code and heating the metal member.

17. The method according to claim 13, wherein the first identification code has a different pattern than the second identification code, and wherein the first identification code and the second identification code contain identical information.

* * * * *

UNITED STATES PATENT AND TRADEMARK OFFICE
CERTIFICATE OF CORRECTION

PATENT NO. : 10,726,213 B2  
APPLICATION NO. : 15/983097  
DATED : July 28, 2020  
INVENTOR(S) : Jin Oda et al.

Page 1 of 1

It is certified that error appears in the above-identified patent and that said Letters Patent is hereby corrected as shown below:

In the Claims

Column 14, Line 36, cancel the text beginning with "13. The method according to claim 1, A metal product manufacturing method comprising:" and ending "wherein the second range is narrower than the first range" in Column 14, Line 63, and insert the following claim:

-- 13. A metal product manufacturing method comprising:

forming a first identification code onto a surface of a metal member with a first laser beam, the first identification code being readable under a first reading condition;

heating the metal member on which the identification code is formed;

reading the first identification code with a reading device; and forming, with a second laser beam, a second identification code onto the surface of the metal member subsequent to heating the metal member, wherein the second identification code is based on the first identification code which is read with the reading device, the second identification code being readable under a second reading condition different from the first reading condition, wherein the first reading condition is associated with a first range of one or more reading parameters and the second reading condition is associated with a second range of the one or more reading parameters, wherein the one or more parameters comprise at least one of: an exposure time, an intensity of a light source, a reading angle relative to the surface of the metal member, a reading position relative to the surface, a reading distance relative to the surface, a reading device sensitivity, and a number of repeated readings, and wherein the second range is narrower than the first range. --

Signed and Sealed this  
Thirteenth Day of October, 2020

Andrei Iancu  
*Director of the United States Patent and Trademark Office*